March 6, 1928.

H. PERPALL

TRANSMISSION BELT

Filed July 1, 1926

1,661,300

2 Sheets-Sheet 1

WITNESSES:
Alfred E. Tschinger
George A. Gruss

INVENTOR:
Harold Perpall,
BY Joshua R.H. Potts
ATTORNEY.

March 6, 1928.
H. PERPALL
TRANSMISSION BELT
Filed July 1, 1926   2 Sheets-Sheet 2
FIG. 7.
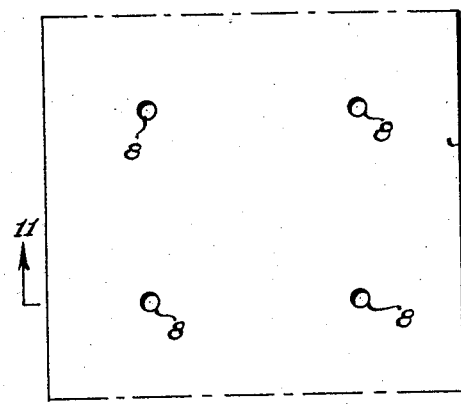
FIG. 8.
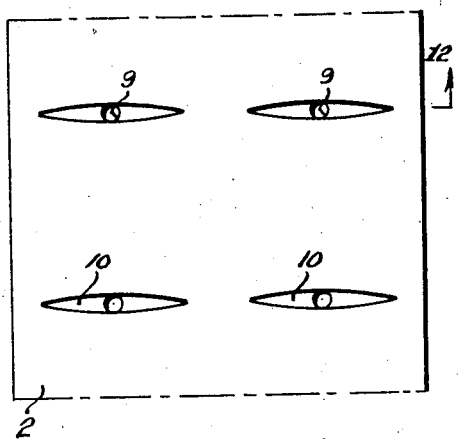
FIG. 11.
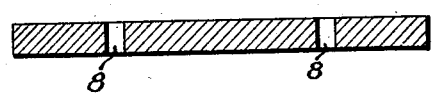
FIG. 12.
FIG. 9.
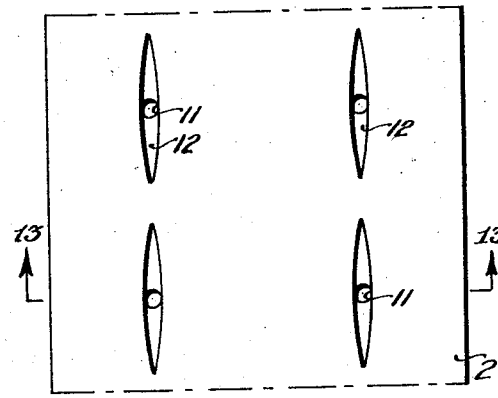
FIG. 10.
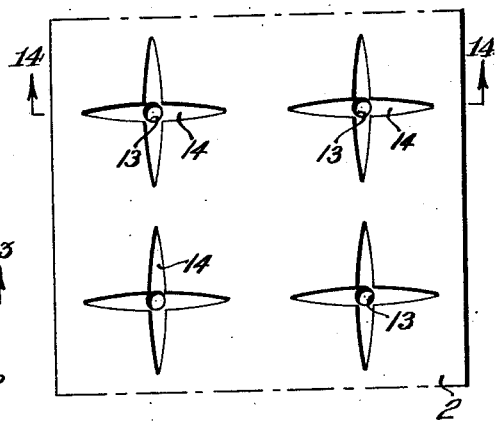
FIG. 13.
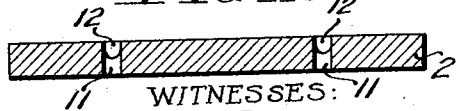
FIG. 14.
WITNESSES:
Alfred E. Oschinger
George A. Gruss
INVENTOR:
Harold Perpall,
BY Joshua R. H. Roth
ATTORNEY.

Patented Mar. 6, 1928.

1,661,300

UNITED STATES PATENT OFFICE.

HAROLD PERPALL, OF PHILADELPHIA, PENNSYLVANIA.

TRANSMISSION BELT.

Application filed July 1, 1926. Serial No. 119,850.

This invention relates to transmission belts.

It is well known that the power transmitted by a belt depends upon its contact with the pulley, upon the angle of such contact and upon the initial tension of the belt.

The chief objection to the belts now in use is that the initial belt tension necessary to avoid excessive slipping, is of such degree as to cause considerable pressure and wear on the bearings, and to withstand such tension the belts used are usually heavy and therefore expensive. A further objection is that a loss of power results from such slipping.

I have discovered that the principal cause of belt slipping is due to air being sucked in and trapped between the swiftly moving belt and pulley. The air upon being trapped spreads out into a film and acts as a lubricant.

The objects of my invention are to provide a belt which will allow the film of air to escape immediately upon being trapped, thereby avoiding slipping and enabling the belt to transmit power under less tension which permits the use of a smaller and less expensive belt and also reduces the wear and maintenance cost of the bearings owing to the reduction of pressure thereon.

Figure 1:
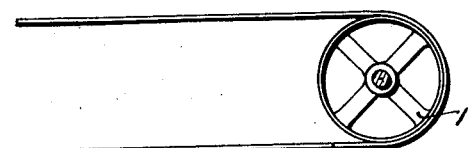

These objects, and other advantageous ends which will be described hereinafter, I attain in the following manner, reference being had to the accompanying drawings in which Figure 1 is a fragmentary side elevation of a pulley and a belt made in accordance with my invention, passing over the pulley.

Figure 2:
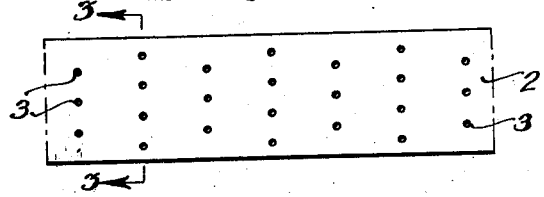
Figure 3:
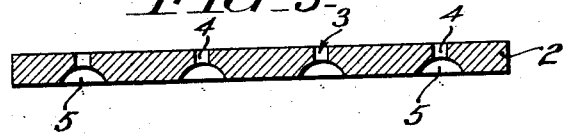
Figure 4:
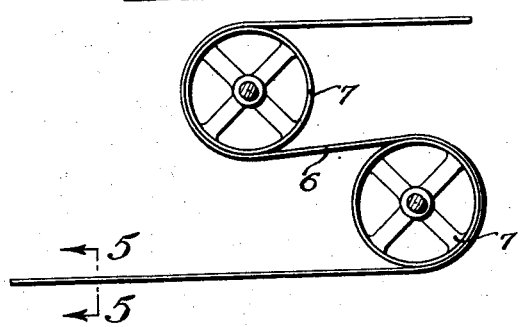
Figure 5:
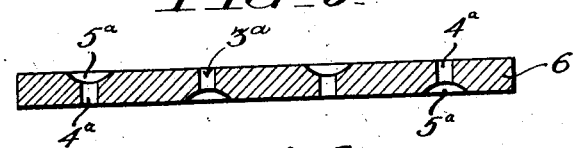
Figure 6:

Figure 2 a fragmentary plan view of the upper run of the belt,

Figure 3 an enlarged section on line 3—3 of Figure 2,

Figure 4 a fragmentary side elevation of a pair of pulleys contacting with the opposite sides of a modified form of belt, Figure 5 an enlarged section on line 5—5 of Figure 4, Figure 6 a like view showing another modified form, Figures 7, 8, 9 and 10 fragmentary plan views of other forms of belts, and Figures 11, 12, 13 and 14 sections on lines 11—11, 12—12, 13—13 and 14—14 of Figures 7, 8, 9 and 10 respectively.

Referring to the drawings, 1 indicates a pulley and 2 a belt, preferably of leather, passing over the pulley. The belt has perforations 3 suitably spaced and preferably arranged in rows, as shown in Figure 2. The perforations are preferably in the form of openings 4 leading from the outer side of the belt and communicating with air accumulating pockets 5 cut in the inner side of the belt. These pockets may be in the form of cupped recesses as shown in Figure 3 or grooves as shown in Figures 8–10. The pockets serve as channels through which the air, trapped between the belt and the pulley, passes to the openings to escape to the outside of the belt.

When both sides of a belt 6 are each in contact with a pulley 7, as shown in Figure 4, the perforations $3^a$ are arranged with the openings $4^a$ and cupped recesses $5^a$ disposed alternately on each side of the belt as shown in Figure 5, or with the recesses $5^b$ at each side of the belt and the opening $4^b$ between the recesses as shown in Figure 6, to allow escape of trapped air at both pulleys.

In Figures 7 and 11, I have shown the perforations as plain holes 8 drilled through the belt. In Figures 8 and 12, the perforations are in the form of openings 9 leading from the outer side of the belt and communicating with transverse grooves 10 cut in the inner side of the belt. In Figures 9 and 13, the perforations consist of openings 11 leading from one side of the belt and communicating with longitudinal grooves 12 cut in the other side of the belt. In Figures 10 and 14, they are in the form of openings 13 drilled from the outer side of the belt and communicating with cross grooves 14 cut in the inner side of the belt. In each of the modified forms the grooves serve as channels through which the trapped air may pass to the openings to escape to outside the belt.

In use the belt is applied to a pulley with the air accumulating pockets on the inner or pulley contacting side of the belt. In operation the high speed of the belt and pulley causes air to be drawn in and trapped between the belt and pulley. The trapped air becoming compressed between the belt and pulley spreads out into a film which, if not permitted to escape would act as a lubricant between the belt and pulley and cause slipping. But due to the air accumulating pockets 5, the trapped air is free to pass to and escape through the openings 4 to outside the belt. The belt and pulley being thus kept free of the film of air, allows the full surface of the belt to contact with the pulley at all times.

From actual use of the belt set forth, I have found that less tension and smaller belts are required for efficiently transmitting power, thereby effecting a saving in the cost of belts, maintenance and wear on the bearings.

In addition to permitting the escape of air, the perforations tend to increase the friction between the belt and pulley and thus aid the belt in gripping the pulley.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A transmission belt having a plurality of individual pockets on one side thereof extending less than half way through the belt for trapping air between the belt and a pulley, and perforations through said belt of minute diameter communicating with said pockets.

2. A belt having a plurality of shallow pockets on surfaces thereof for rapidly absorbing a confined air film created between said surfaces and a pulley operatively associated therewith, and means in said belt for providing an outlet for said air so that no pressure may exist between said surfaces and a pulley, said means being substantially equally distributed on both sides of the belt.

3. A belt having pockets on the surfaces thereof extending partly through the belt, the area covered by said pockets equaling a substantial portion of said surfaces of the belt, perforations leading from said pockets through the belt to the opposite surfaces, the area covered by said perforations extending through to the opposite surfaces of said belt being minute as compared with the area of the recess.

4. A belt having a plurality of recesses on the opposite sides thereof, said recesses covering a substantial portion of the area of said belt, the deepest point of said recesses extending through a relatively small portion of the thickness of the belt, apertures of minute diameter connecting said recesses with the side of the belt opposite, a recess on one side of the belt being situated between two recesses in the surface of the opposite side.

In testimony whereof I have signed my name to this specification.

HAROLD PERPALL.